(12) United States Patent
Encío Martinez et al.

(10) Patent No.: US 7,229,698 B2
(45) Date of Patent: Jun. 12, 2007

(54) LAMINATED BOARD FOR EXTERIOR CLADDING

(75) Inventors: Fernando Encío Martinez, Navarra (ES); Santiago Bastida Sagarzazu, Navarra (ES)

(73) Assignee: Composites Gurea, S.A., Navarra (ES)

( * ) Notice: Subject to any disclaimer, the term of this patent is extended or adjusted under 35 U.S.C. 154(b) by 163 days.

(21) Appl. No.: 10/615,602

(22) Filed: Jul. 8, 2003

(65) Prior Publication Data

US 2004/0137255 A1 Jul. 15, 2004

(30) Foreign Application Priority Data

Aug. 5, 2002 (ES) ................ 200300262

(51) Int. Cl.
*B32B 31/04* (2006.01)
(52) U.S. Cl. ............. 428/503; 428/505; 428/507; 428/526; 428/532; 428/537.1; 428/537.5
(58) Field of Classification Search ............ 428/503, 428/505, 507, 526, 532, 537.1, 537.5
See application file for complete search history.

(56) References Cited

U.S. PATENT DOCUMENTS 3,616,021 A * 10/1971 Valerius .............. 156/247
3,767,439 A * 10/1973 Moyer et al. ............ 106/210.1
5,047,282 A * 9/1991 Mier ..................... 428/204

FOREIGN PATENT DOCUMENTS

JP 58209508 A * 12/1983
SU 865873 B * 9/1981

OTHER PUBLICATIONS

Translation of JP 58-209508, "Method for Manufacturing a Resin-Reinforced Wooden Panel".*

* cited by examiner

*Primary Examiner*—Elizabeth M. Cole
(74) *Attorney, Agent, or Firm*—Ladas & Parry LLP

(57) ABSTRACT

Laminated board for exterior cladding formed from a core (13) of kraft paper impregnated with phenolic resin, at least one layer of natural wood (14) and at least one surface covering layer (15) including a coating film (17) and a substrate film (16). The coating film (17) is a single-layer film based on polymethyl methacrylate (PMMA), a two-layer film with its lower layer based on polymethyl methacrylate and its upper layer based on polyvinylidine fluoride (PVDF), or a PMMA/PVDF single-layer film. The substrate film (16) consists of a paper impregnated with a compound formed from 80-95% by weight of a phenolic resin and 5-20% by weight of a polymer promoting adhesion of the coating film (17), such as an acrylic, melamine or urea polymer or a combination thereof.

6 Claims, 1 Drawing Sheet

LAMINATED BOARD FOR EXTERIOR CLADDING

FIELD OF THE INVENTION

This invention relates to a laminated board for cladding surfaces exposed to the weather and, in particular, a laminated board having at least one layer of natural wood.

PRIOR ART

The aesthetic properties of natural wood make it very desirable as a basic material for various types of construction components, and more particularly exterior cladding components.

Various solutions have been put forward in the art to overcome the problems deriving from the high cost of natural wood and its deterioration due to the weather. One of these comprises forming a laminated board by pressing a block comprising a base layer of a cellulose material, (at least) one intermediate layer consisting of a very thin sheet of natural wood and (at least one) outer covering layer formed, from an appropriate material under specific pressure and temperature conditions, the said materials being impregnated by synthetic resins which help to create a very compact and strong board through the application of pressure and heat.

In this respect Swiss patent no. 477272, published on the 15 Oct. 1969, describes boards of this type having a base layer of cellulose material, two intermediate layers of wood sheet and two outer covering layers to provide adequate protection for the natural wood.

Of the various materials which have been used to form boards, a number are known in the art.

Thus, with regard to the base layer, French patent no. 2096943, the application for which was published on the 3 Mar. 1972, describes in particular the use of kraft paper impregnated with a phenol resin as a base layer or, using the terminology in that patent, as a reinforcing member for the board. The material is being currently used for this purpose.

As far as the covering layer is concerned, the art has continued to offer a multitude of materials having useful properties to protect the board in the very different environmental conditions to which a board permanently exposed to the weather is subjected.

In this respect a large number of solutions specifically proposed for boards which incorporate sheets of natural wood as solutions for various types of laminated boards of cellulose material formed by pressing various layers are known.

We will summarize some of these solutions briefly below.

French patent 2310872, the application for which was published on the 10 Dec. 1976, mentions covering layers of cellulose paper impregnated with melamine resin, which may also be coloured.

British patent application GB 2020199 A, published on the 14 Nov. 1979, describes a process for the manufacture of a cellulose paper coated with melamine resin which can be applied to various types of boards to impart resistance to abrasion and heat and the action of particular chemical products.

Spanish patent ES 8300047, published in 1983, describes two types of covering layer: a resin-impregnated decorative layer which is stable to heat and an upper layer which provides a surface which proves to be protective against abrasion formed for example by an alpha-cellulose paper impregnated with a high quality heat-stable resin such as melamine/formaldehyde, which is made transparent by consolidation of the laminated assembly by heat and pressure.

European patent EP 0281586, the application for which was published on the 10 Mar. 1988, describes a laminated board with an upper layer of acrylic resin.

More recently one or more skin materials, which, using the terminology conventionally used in the industry we will refer to below as films, provided by the chemical industry to satisfy the covering needs of many different types of industrial products, have been used for the surface covering layer of laminated boards.

Among these films, films based on polymethyl methacrylate (PMMA) are of a special interest for the upper part of the covering layer of the laminated boards which we are considering. However, the adhesion of these films to the films used in the lower part and in direct contact with the sheet of natural wood such as, for example, films impregnated with phenolic resins, is a problem.

In application WO 01/05587 published on the 25 Jan. 2001 it is proposed that this disadvantage should be overcome by adding an adhesive and an absorbent cellulose film between the acrylic film and the film located on the sheet of natural wood, both films being impregnated with a resin of the same nature.

This solution is costly, and therefore this invention proposes an alternative solution to the problem mentioned, with additional advantages.

SUMMARY OF THE INVENTION

The subject matter of this invention is a laminated board for exterior cladding which includes a core of kraft paper impregnated with phenolic resin, at least one sheet of natural wood and at least one surface covering layer which includes a coating film providing the board with high resistance to various atmospheric agents (moisture, solar radiation, etc.) and a substrate film which provides good adhesion between the abovementioned coating film during manufacture of the board by consolidation and compaction of its components through the application of pressure and heat.

Both a single-layer film based on polymethyl methacrylate (PMMA), which has good surface properties against various atmospheric agents, and a two-layer film on a lower layer based on polymethyl methacrylate (PMMA) and an upper layer based on polyvinylidine fluoride (PVDF), which has better performance than the above as a protective component for the board, or a single-layer PMMA/PVDF film (with the PVDF dispersed in the PMMA) giving similar performance to the above, are also considered to be appropriate as coating films.

As a substrate film it is proposed that a paper impregnated with a compound formed from a phenolic resin in a proportion of between 80 and 95% by weight and a polymer which promotes adhesion of the coating film in a proportion of between 5 and 20% by weight should be used.

These adhesion-promoting polymers include acrylic, melamine and urea polymers and combinations of the same.

The fundamental advantage of this invention lies in the possibility of using a number of high quality coating films provided by the chemical industry for a variety of applications in the manufacture of laminated boards having a layer of natural wood, using the conventional pressing process under specific pressure and temperature conditions and without the need to use specific layers of adhesive.

Other features and advantages of this invention will be apparent from the detailed description of the invention below, with reference to the accompanying drawings.

DETAILED DESCRIPTION FO THE INVENTION

Figure 1:
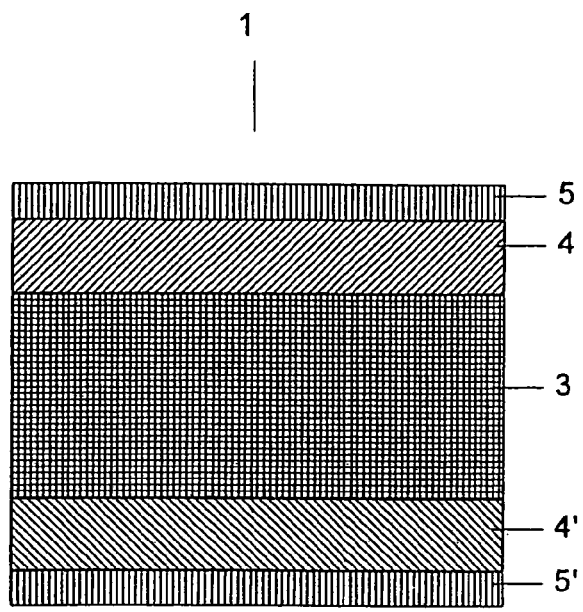
FIG. 1 shows a diagrammatical view of the transverse cross-section of a laminated board known in the art.

This invention is based on a board which the applicant has manufactured and marketed since the year 1994, having the trade name PARKLEX 1000, and which we will describe briefly with reference to FIG. 1.

The basic components of board 1, all of which are available on the market, are a core 3 of kraft paper impregnated with phenolic resins, thin sheets of wood 4, 4' and covering layers 5, 5' formed from at least one film impregnated with a resin which imparts an aesthetic appearance and appropriate surface properties for its purpose.

A person skilled in the art will understand that board 1 known in the art may include components in addition to those mentioned, such as films having a decorative purpose in order, for example, to provide the board with particular ornament or colour, or films placed between core 3 and sheets of wood 4, 4' to prevent the phenolic resins of core 3 affecting the colour of the natural wood.

This assembly is subjected to specific pressure and heat conditions which bring about compaction and consolidation—in which polymerization of the resins mentioned has a determining role—yielding a product with the aesthetic appearance of natural wood but much superior resistance to the weather.

According to this invention, the surface properties of the said board can be improved by modifying its covering layer in such a way that, while the process of manufacture of the board by pressing its components under specific pressure and temperature conditions is unchanged, some films offered by the industry, having properties which are particularly appropriate for the boards which we are considering such as, in particular, films based on polymethyl methacrylate (PMMA) and films based on polymethylmethacrylate (PMMA) and polyvinylidine fluoride (PVDF), can be used in the upper part of the covering layer.

An example of the former is PLEXIGLAS® 99845 film marketed by Röhm GmbH & Co. KG.

Figure 2:
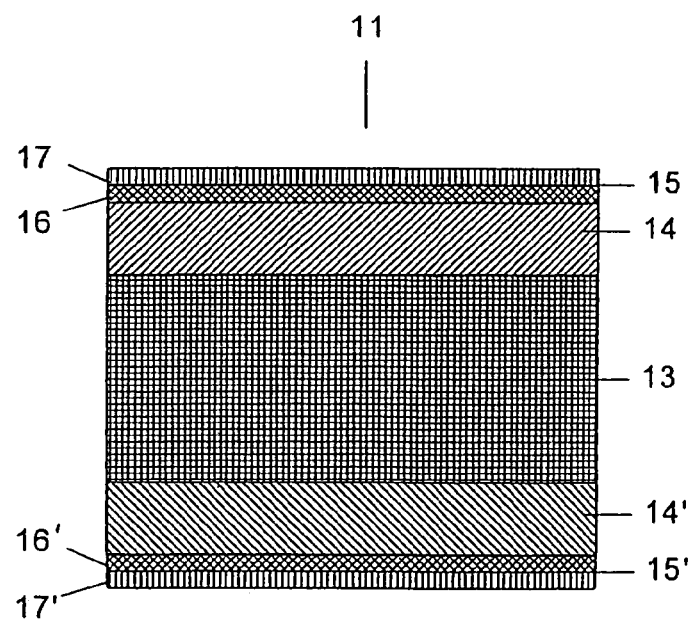
FIG. 2 shows a diagrammatical view in transverse cross-section of a laminated board according to this invention.

As an example of the latter mention may be made of EUROPLEX® 99710 film marketed by Röhm GmbH & Co. KG and the KYNAR® PVDF films marketed by Atofina Chemicals Inc. The following may be mentioned as significant properties of these films:

- mechanical strength and hardness
- high resistance to abrasion
- high thermal stability
- high dielectric strength
- high degree of purity
- easy melting
- resistance to most chemicals and solvents
- resistance to ultraviolet rays and nuclear radiation
- resistance to atmospheric agents
- resistance to all types of fungi
- low permeability for most gases and liquids
- low levels of flame and smoke As illustrated in FIG. 2, board 11 according to the invention has a core 13 of kraft paper impregnated with phenolic resins and layers of wood 14, 14' precisely the same as board 1 previously known in the art. However, unlike it, covering layer 15, 15' is formed from an outer coating film 17, 17', such as those mentioned, and a substrate film 16, 16' which while providing a particular aesthetic appearance for the product also provides good adhesion for coating film 17, 17'.

It is intended in this way that the barrier properties of the coating film against atmospheric agents such as UV radiation and water will be imparted to the board, thus appreciably improving its properties with respect to the said agents.

The applicant for this invention is not aware of any other commercial product which can act like substrate film 16, 16', aiding adhesion of coating film 17, 17', without the need for a layer of adhesive placed between the two films, but has found that this function can be satisfactorily performed by a thin sheet of paper impregnated with a resin formed from a phenolic resin as a major component and an adhesion-promoting polymer as a minor component (between 5 and 20% by weight).

Surprisingly it has been found that acrylic, melamine and urea polymers, either pure or in combination, in proportions of between 5 and 20% as mentioned, perform satisfactorily as polymers promoting the adhesion of single-layer coating films based on PMMA, such as PLEXIGLASS® 99845, or two-layer films with a lower layer based on PMMA, such as EUROPLEX® 99710.

Because of its solubility in water, the use of a melamine polymer is particularly useful in combination with water-based phenolic resins. In addition to this it has been observed that this polymer improves resistance to UV rays.

The process for obtaining said substrate film 16, 16' is the conventional one: passing a sheet of paper through a bath of resin having the composition mentioned and a set of impregnating rollers. On leaving this bath the wet sheet passes through a drying tunnel in which the moisture level and the progress of the resin polymerization reaction are adjusted by controlling the temperature and the speed of the sheet. Although the above description has always mentioned a board having an asymmetrical structure, those skilled in the art will understand that boards configured differently, especially on the side which is intended not to be seen, will fall within the scope of the invention. In these cases, on the side which is not seen, sheet of wood 14' and covering layer 15' may be replaced by other components. For example, instead of acrylic or fluorinated coating films like those mentioned, other films such as PVC, polypropylenes or polyesters which are not resistant to UV radiation but are resistant to moisture may be used.

Various examples of embodiments of the invention are described below to provide a better illustration of the same.

EXAMPLE 1

A substrate film comprising a 42 g/m² paper impregnated with a phenolic resin (phenyl-formaldehyde resin of the resol type) in an aqueous base in which a melamine resin has been dissolved in a proportion of 10% (w/w) is placed on the outer surface of the wooden layer of the board and on this is placed as a coating film EUROPLEX 99.710 film from the Röhm company, with its acrylic part in contact with the substrate film and leaving the PVDF film on the outside of the board. This assembly is subjected to a pressure of between 5 and 10 MPa at 140° C. for 15 minutes.

EXAMPLE 2

A substrate film comprising a 42 g/m² paper impregnated with a water-based phenolic resin in which an acrylic melamine resin has been dissolved in a proportion of 10% (w/w) is placed on the outer surface of the wood layer of the board and on this PLEXIGLAS 99845 film from the Röhm company is placed as a coating film. This assembly is subjected to a pressure of between 5 and 10 MPa at 140° C. for 15 minutes.

We will show below the results of some tests performed with different types of boards.

Firstly, we will show the results of adhesion tests in Table 1. The protective efficiency of the films against moisture and solar radiation depends on adequate adhesion to the surface of the board. This adhesion is evaluated by mere visual observation of the surface appearance of the board after it has been subjected to various treatments.

Table 1 summarizes the results of adhesion tests for:
board with EUROPLEX 99.710 film as the coating film placed on a film of impregnated substrate with only one phenolic resin, (T2)
board according to example 1 (T3)
board according to example 2 (T4)

The treatments were:
no treatment (E1)
immersion in water at 65° C. for 48 hours (E2)
immersion in boiling water for 2 hours (E3)
residence in a "Solarbox" ageing chamber for various periods of time of between 100 and 1500 hours (E4100 to E41500).

TABLE 1

|   | T2 | T3 | T4 |
|---|---|---|---|
| E1 | Very good | Very good | Very good |
| E2 | Satisfactory | Very good | Very good |
| E3 | Poor | Very good | Good |
| $E4_{100}$ | Very good | Very good | Very good |
| $E4_{500}$ | Satisfactory | Very good | Very good |
| $E4_{1500}$ | Poor | Very good | Good |

Very good: no signs of detachment. Unchanged
Good: very small blisters or very slight fogging
Satisfactory: small blisters or slight fogging
Poor: obvious blisters or fogging
Very poor: total detachment of the film These results show an obvious improvement in the adhesion of the films when substrate films according to the invention are used. This improvement takes the form of a better surface appearance of the boards subjected to immersion treatment in water.

Secondly, and in Table 2, we show the results of moisture absorption tests in terms of the gain in weight of test specimens following immersion in boiling water for 2 hours. Moisture absorption is a parameter of vital importance given that it is the combined effect of water, oxygen and solar radiation which initiates the main processes of degradation of board components. A board without a coating film (T1) has been added to the boards tested.

TABLE 2

|   | T1 | T2 | T3 | T4 |
|---|---|---|---|---|
| E3 | 1.28% | 1.17% | 0.66% | 0.71% |

These results show that the incorporation of coating films reduces water absorption and that this reduction is greater the better the level of adhesion with the substrate film. Two-layer films with fluorinated surfaces, which are therefore very hydrophobic, offer the best performance.

Finally we show in Table 3 the results of accelerated ageing tests carried out in "Solarbox 1500" chambers and subjected to two different "dry period/wet period" cycles (during the dry period the test specimens are subjected to dry UV radiation and during the wet period they are subjected to the same radiation but are submerged in 1 mm of water). The cycles were 2 hours/2 hours, and 3 hours/1 hour.

Although the agressivity of the two cycles is different and the level of degradation is also different, the differences in behaviour between the different boards appear again, and the results of the two types of test are summarized in Table 3. In this case the evaluation was carried out in accordance with ISO standard 105-A 02 ("Grey Scale") which measures progressive bleaching of the surface from unchanged (5) to wholly bleached (1).

TABLE 3

|   | T1 | T2 | T3 | T4 |
|---|---|---|---|---|
| $E4_{100}$ | 4 | 5 | 5 | 5 |
| $E4_{500}$ | 3–2 | 4* | 5 | 5 |
| $E4_{1500}$ | 1 | 3** | 5 | 4 |

*Onset of film detachment (small blisters at the edges)
**Detachment of the film (obvious blisters and detachment at the edges)

The results show that the incorporation of coating films which act as filters for UV radiation and water appreciably improve the weather resistance of the boards and that this resistance is greater the better the level of adhesion to the substrate film. Two-layer acrylic films with fluorinated surfaces offer the best performance.

Although one embodiment of the invention has been described and illustrated, it is obvious that modifications within the scope of the same may be made to it, and the invention should not be considered to be restricted to this embodiment, but only the content of the following claims:

The invention claimed is:

1. Laminated board (11) for exterior cladding comprising a core (13) of kraft paper impregnated with phenolic resin, at least one layer of natural wood (14) and at least one surface covering layer (15) which includes a coating film (17) and a substrate film (16), characterized in that:
   a) the coating film (17) is a film with at least one layer of polymethylmethacrylate (PMMA) either pure or modified through the addition of other polymers,
   b) the substrate film (16) is a paper impregnated with a compound formed from a phenolic resin in a proportion of between 95 and 80% by weight and a polymer promoting adhesion of the said coating film (17) in a proportion of between 5 and 20% by weight, wherein the adhesion-promoting polymer is an acrylic polymer.

2. Laminated board (11) according to claim 1, characterized in that the coating film (17) is a single-layer film based on polymethyl methacrylate (PMMA) modified with polyvinylidine fluoride (PVDF).

3. Laminated board (11) according to claim 1, characterized in that the coating film (17) is a two-layer film with an upper layer based on polyvinylidine fluoride (PVDF).

4. A laminated board for exterior cladding comprising a core of kraft paper impregnated with phenolic resin, at least one layer of natural wood atop the core, and at least one coating film layer atop the at least one layer of natural wood, the improvement comprising substrate film means between the at least one layer of natural wood and the at least one coating film layer for improving adhesion of the coating film layer to the natural wood layer, said substrate film means comprising a paper impregnated with a compound formed from (a) a phenolic resin in a proportion of between 95 and 80 wt % and (b) a polymer that promotes adhesion of the at least one coating film layer in a proportion of between 5 and 20 wt %; said at least one coating film layer comprising polymethylmethacrylate, wherein the adhesion-promoting polymer comprises an acrylic polymer.

5. The laminated board according to claim 4, wherein the at least one coating film layer comprises polymethylmethacrylate modified with polyvinylidine fluoride.

6. The laminated board according to claim 4, comprising, in addition to the at least one coating film layer, an upper layer based on polyvinylidine fluoride.

* * * * *